(12) United States Patent
Meunier

(10) Patent No.: US 7,392,473 B2
(45) Date of Patent: Jun. 24, 2008

(54) METHOD AND APPARATUS FOR DETERMINING LOGICAL DOCUMENT STRUCTURE

(75) Inventor: Jean-Luc Meunier, Saint Nazaire les Eymes (FR)

(73) Assignee: Xerox Corporation, Norwalk, CT (US)

(*) Notice: Subject to any disclaimer, the term of this patent is extended or adjusted under 35 U.S.C. 154(b) by 473 days.

(21) Appl. No.: 11/137,566

(22) Filed: May 26, 2005

(65) Prior Publication Data

US 2006/0271847 A1    Nov. 30, 2006

(51) Int. Cl.
*G06N 3/00* (2006.01)

(52) U.S. Cl. ...................................... 715/247

(58) Field of Classification Search ............... 715/513, 715/517, 523, 530
See application file for complete search history.

(56) References Cited

U.S. PATENT DOCUMENTS

| | | | |
|---|---|---|---|
| 5,369,742 A * | 11/1994 | Kurosu et al. ............... | 715/522 |
| 5,486,686 A | 1/1996 | Zdybel, Jr. et al. | |
| 5,633,996 A | 5/1997 | Hayashi et al. | |
| 5,850,226 A * | 12/1998 | Nagasawa et al. ........... | 345/428 |
| 5,884,014 A | 3/1999 | Huttenlocher et al. | |

OTHER PUBLICATIONS

M. Aiello, A.M.W Smeulders, "Thick 2D Relations for Document Understanding", Preprint submitted to Elsevier Science, Mar. 2002.
CambridgeDocs PDF-to-XML converter, available on the Internet at www.cambridgedocs.com/products_pdfxmlconverter.htm,, Apr. 8, 2005.
R. Cattoni, T. Coianiz, S. Messelodi, C.M. Modena, "Geometric Layout Analysis Techniques for Document Image Understanding: a Review", ITC-IRST Technical Report #9703-09, 1998.
Dynamic Programming, available on the Internet at http://en.wikipedia.org/wiki/Dynamic_programming, Apr. 8, 2005.
Jaekyu Ha, R.M. Haralick, I.T. Phillips, "Recursive X-Y cut using bounding boxes of connected components", International Conference on Document Analysis and Recognition (ICDAR), vol. 2, 1995.

(Continued)

*Primary Examiner*—Stephen Hong
*Assistant Examiner*—Kyle R Stork
(74) *Attorney, Agent, or Firm*—Oliff & Berridge, PLC

(57) ABSTRACT

Methods are disclosed for recovering or determining logical structure of a document by assessing different combinations of vertical and horizontal cuts across a block of the document. The block is segmented using a scoring function that discards horizontal cuts in favor of vertical cuts shared among neighboring sub-blocks. The order in which the blocks and sub-blocks are segmented is then used to define the logical structure of the document, such as its reading order.

23 Claims, 6 Drawing Sheets

OTHER PUBLICATIONS

Y. Ishitani, "Document Transformation System from Papers to XML Data Based on Pivot XML Document Method", International conference on document analysis and recognition (ICDAR), 2003.

A. K. Jain, M. N. Myrthy, and P. J. Flynn, "Data Clustering: A Review", ACM Computing Survey 31(3):264-323, 1999.

S. Mao and T. Kanungo, "A Methodology for Empirical Performance Evaluation of Page Segmentation Algorithms," Technical Report CAR-TR-933, Univ. of Maryland, College Park, Dec. 1999.

G. Nagy and S. Seth, "Hierarchical representation of optically scanned documents", Proceedings of the 7th International Conference On Pattern Recognition, pp. 347-349, 1984.

PDF2HTML Project Summary, available on the Internet at http://sourceforge.net/projects/pdftohtml, Apr. 8, 2005.

U.S. Appl. No. 11/032,817, entitled "Method And Apparatus For Detecting Pagination Constructs Including A Header And A Footer In Legacy Documents", filed Jan. 10, 2005.

S. Harrington et al., "Aesthetic Measures for Automated Document Layout," *Proceedings of the 2004 ACM Symposium on Document Engineering*, pp. 109-111, Oct. 28, 2004.

C. Jacobs et al., "Adaptive Grid-Based Document Layout," *ACM Transactions on Graphics*, vol. 22, No. 3, pp. 838-847, Jul. 2003.

A. Simon et al., "A Fast Algorithm for Bottom-Up Document Layout Analysis," *IEEE Transactions on Pattern Analysis and Machine Intelligence*, vol. 19, No. 3, pp. 273-277, Mar. 1997.

J. Liang et al., "Document Layout Structure Extraction Using Bounding Boxes of Different Entities," *Proceedings 3rd IEEE Workshop on Sarasota*, pp. 278-283, Dec. 2, 1996.

European Search Report.

* cited by examiner

```
# enumerate horizontal cuts to define a set of sub-blocks referenced by i
Function BC(i, X):
  if alreadyComputed(i, X): return memorization(i, X)
  # possible X-cuts in block i alone
  Xi = XCut(i)
  if X = ∅:
    # not required to share an X-cut with previous block.
    # either share the local Xi vertical cut with next block
    sc1 = BC(i+1, Xi)
    if sc1 != 0:
      # if the sharing can be pursued, reward for height of block i
      sc1 = sc1 + height(i)
    # or horizontally cut between block i and block i+1
    sc2 = BC(i+1,∅)
    score = max( sc1, sc2 )
  else: # required to share a vertical cut with previous block(s)
    X' = intersect(X, Xi)
    If X' = ∅ or tooNarrow(X'):
      score = 0
    else: # reward the making of columns
      share_score = 1/dist(i-1, i) + height(i)
      # pursue the sharing or not?
      sc1 = BC(i+1,X') # if pursuing the sharing
      sc2 = BC(i+1,∅) # score if not pursuing
      score = share_score + max(sc1, sc2)
  memorize(i, X, score)
  return score
```

FIG. 5

METHOD AND APPARATUS FOR DETERMINING LOGICAL DOCUMENT STRUCTURE

BACKGROUND AND SUMMARY

The following relates generally to methods, apparatus and articles of manufacture therefor, for determining logical document structure, such as, the reading or viewing order of a document.

While the use of electronically created and recorded documents is prevalent, many such electronic documents are in a form that does not permit that they be used other than for viewing or printing. Reasons for this restriction include, among others, the unavailability of the document in its native format (e.g., only scanned original of a document or lower-level representation exists), or the deprecation or disappearance of the document's original authoring environment (e.g., document editors that are no longer sold or operate on existing software platforms).

The recovery of document content (e.g., characters, words, etc.) and logical structure (e.g., viewing and reading order) form the basis for effective document reuse, beyond applications such as viewing and printing. However, when electronic documents are recovered by scanning a hardcopy representation or by recovering an electronic representation (e.g., PDF or Postscript representation), a loss of logical document structure usually results because the representations of the document is either at a very low level (e.g., bitmap) or an intermediate level (e.g., a document formatted in a page description language or a portable document format).

The logical organization of objects in electronic documents recorded in low-level or intermediate-level representations may lose certain high-level representations (e.g., that permit editing of high-level constructs) because they have been optimized for their particular application, such as printing, display, or storage. For example, the order in which objects forming a document formatted in a print-oriented or storage-oriented file format may be optimized for printing or storage rather than the logical order of the objects in the document. In order to achieve certain print, storage, or display efficiencies, electronic documents recorded in optimized print, storage, or display formats may dispose of high-level constructs or group elements of a document together in an order that appears out of its logical flow.

In contrast, hardcopy documents converted to an electronic form by scanning lose their document structure unless augmented with a high-level description (see for example U.S. Pat. No. 5,486,686, which is incorporated herein in its entirety by reference). Optical Character Recognition (OCR) may be used for recovering and recognizing objects in a document image to identify low-level representations (e.g., at the character or word level) or intermediate-level representations (e.g., formatting, paragraphs and object detection) of a document image. In addition, there exists methods for recovering certain aspects of a document's high-level representation to allow applications that rely on a document's logical structure to operate or automatically process its content, such as, document editors and document readers.

Methods are known for determining a document's logical structure, or the order in which objects are laid out on a document image (i.e., "layout objects"). Such known methods exploit the geometric or typographical features of document image objects, together with or without the use of the content of objects and a priori knowledge for a particular document class. Such known methods are described, for example, in the following publications, which are incorporated herein by reference: R. Cattoni, T. Coianiz, S. Messelodi, C. M. Modena, "Geometric Layout Analysis Techniques for Document Image Understanding: a Review", ITC-IRST Technical Report #9703-09, 1998; Y. Ishitani, "Document Transformation System from Papers to XML Data Based on Pivot XML Document Method", International conference on document analysis and recognition (ICDAR), 2003; G. Nagy and S. Seth, "Hierarchical representation of optically scanned documents", Proceedings of the 7th International Conference On Pattern Recognition, pp. 347-349, 1984; Jaekyu Ha, R. M. Haralick, I. T. Phillips, "Recursive X-Y cut using bounding boxes of connected components", International Conference on Document Analysis and Recognition (ICDAR), Vol. 2, 1995; and A. K. Jain, M. N. Myrthy, and P. J. Flynn, "Data clustering: A survey", ACM Computing Survey, 31(3):264-323, 1999.

One such known method for segmenting layout objects of a document image is known as the XY-cut method (see Nagy and Seth cited above). Briefly in one embodiment, the method consists in finding the widest cut or the widest empty rectangle (or valley) that crosses the entire page (or block), either vertically or horizontally. The page is then segmented into blocks, which are sized to fit their content. The method is applied recursively to each block, until no valleys remain. In one embodiment of the XY-cut method, bounding boxes of connected components of black pixels are relied on, in place of, image pixel data.

FIG. 1 illustrates an example of page segmentation using the XY-cut method. In FIG. 1, the document image or page 104 has five layout objects (shown with cross-etched fill). When the XY-cut method is performed the first block or page 104 with Y-cut (or horizontal-cut) valley 106 is segmented into block 108 with X-cut (or vertical-cut) valley 110 and block 112 with X-cut (or vertical-cut) valley 114. The XY-cut method repeats until the layout objects on the page 104 are segmented into blocks 1 through 5, as shown in FIG. 1.

While the XY-cut strategy illustrated in FIG. 1 to cut the widest empty rectangle at each recursion works well for layout object segmentation on a page image, the strategy is less adapted for determining the reading order of layout objects on the page image, which reading order may be deduced from the cut hierarchy (e.g., for top-to-bottom and left-to-right reading order, with a vertical cut, the content on the left side of the cut comes before the content on the right side of the cut, and with a horizontal cut, the content on the top side of the cut comes before the content on the bottom side of the cut). For example, when employing the cutting strategy illustrated in FIG. 1 on a two column document page to determine the correct reading order of layout objects on the document page, an error may occur if the page is horizontally cut before cutting vertically along column separations.

There continues to exist, therefore, a need for an improved method for determining the logical ordering of layout objects on a document image, to properly order the content of the layout objects as it would be read by a person when the layout objects of a document image have no ordering (e.g., a scanned bitmap image) or have an incorrect ordering (e.g., are in an order optimized for printing, storing, or display). It would be advantageous if such a method is deterministic and efficient when the method processes a document image with numerous fine-grain layout objects and the layout objects present multiple alternatives in which a page document may be cut along column or row separations.

In accordance with the disclosure herein, there is provided a method for ordering layout objects of a document to determine their logical or semantic (i.e., reading) order. The method is adapted to exploit the geometric features of a document image, thereby advantageously permitting the method to be applied to various classes of documents, such as, documents expressed in various languages. The method may operate with layout objects of document images of various granularities, as the layout objects may contain one or more of letters, words, lines, or paragraphs. The layout objects may, for example, include combinations of textual content and image content.

In accordance with the various embodiments disclosed herein, there is provided a method, apparatus and article of manufacture therefor, for determining a logical order of a document, comprising: (a) assigning a page of the document to be a block having a width along a first direction (e.g., horizontal) and a length along a second direction (e.g., vertical) perpendicular to the first direction; the block having a plurality of layout objects arranged therein; (b) identifying a first set of hypothetical cuts, substantially between layout object boundaries, that span the width of the block; the first set of hypothetical cuts defining a set of sub-blocks with each sub-block having a width along the first direction and a length along the second direction; (c) identifying a second set of hypothetical cuts, substantially between layout object boundaries, that span the length of sub-blocks in the set of sub-blocks; (d) computing arrangement criteria of layout objects ordered according to the first and the second sets of hypothetical cuts; (e) modifying cuts in the first and second sets of hypothetical cuts, using the computed arrangement criteria, to merge cuts that span two or more sub-blocks along the second direction; (f) determining the logical order of the document using cuts between layout objects in the block remaining in the first and second sets of hypothetical cuts after performing (e).

BRIEF DESCRIPTION OF THE DRAWINGS

These and other aspects of the disclosure will become apparent from the following description read in conjunction with the accompanying drawings wherein the same reference numerals have been applied to like parts and in which:

FIG. 5 sets forth an alternate embodiment for determining logical document structure with recursion and dynamic programming;

DETAILED DESCRIPTION

A. Context for Determining Logical Document Structure

Figure 1:
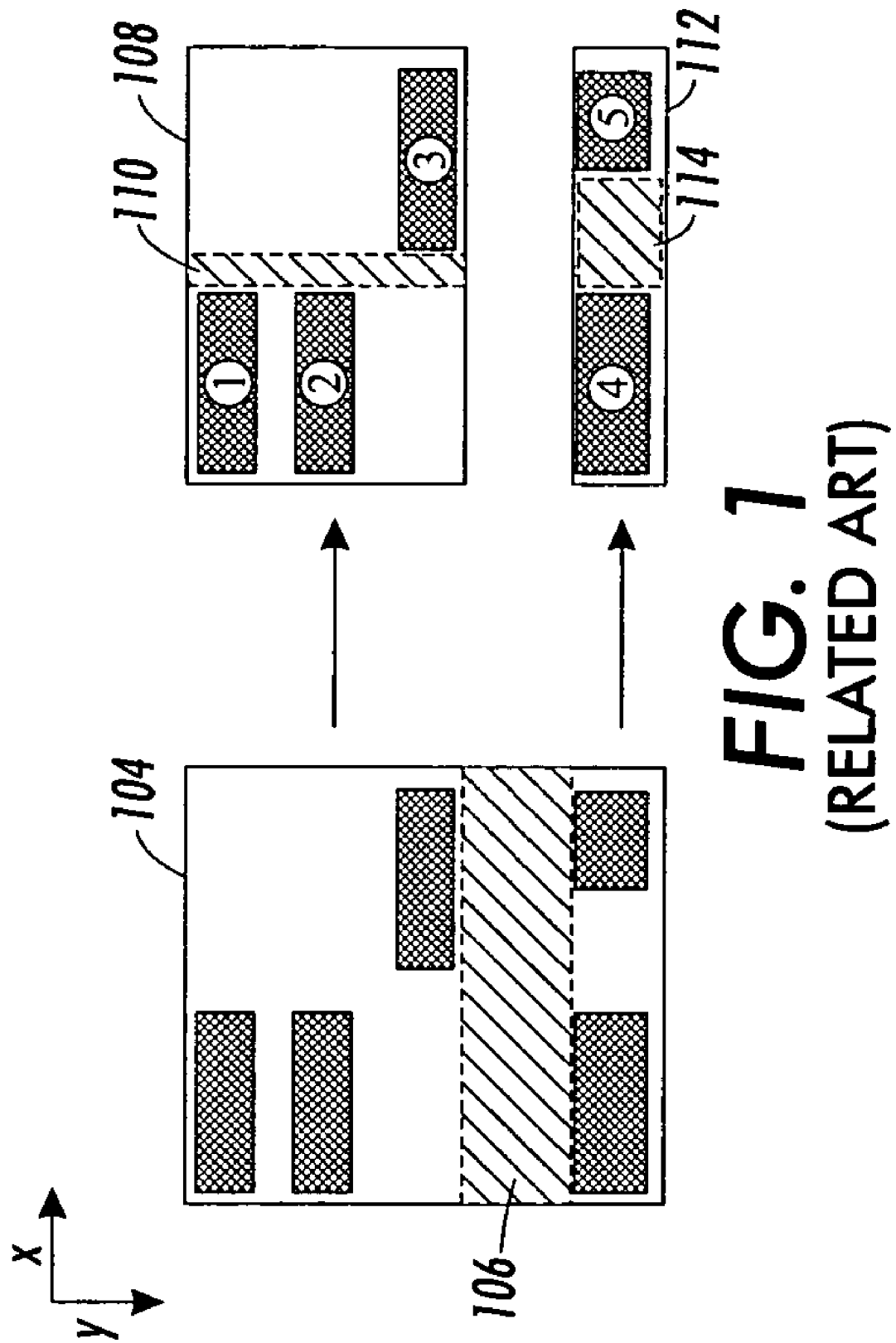
FIG. 1 illustrates an example of page segmentation using the XY-cut method.
Figure 2:
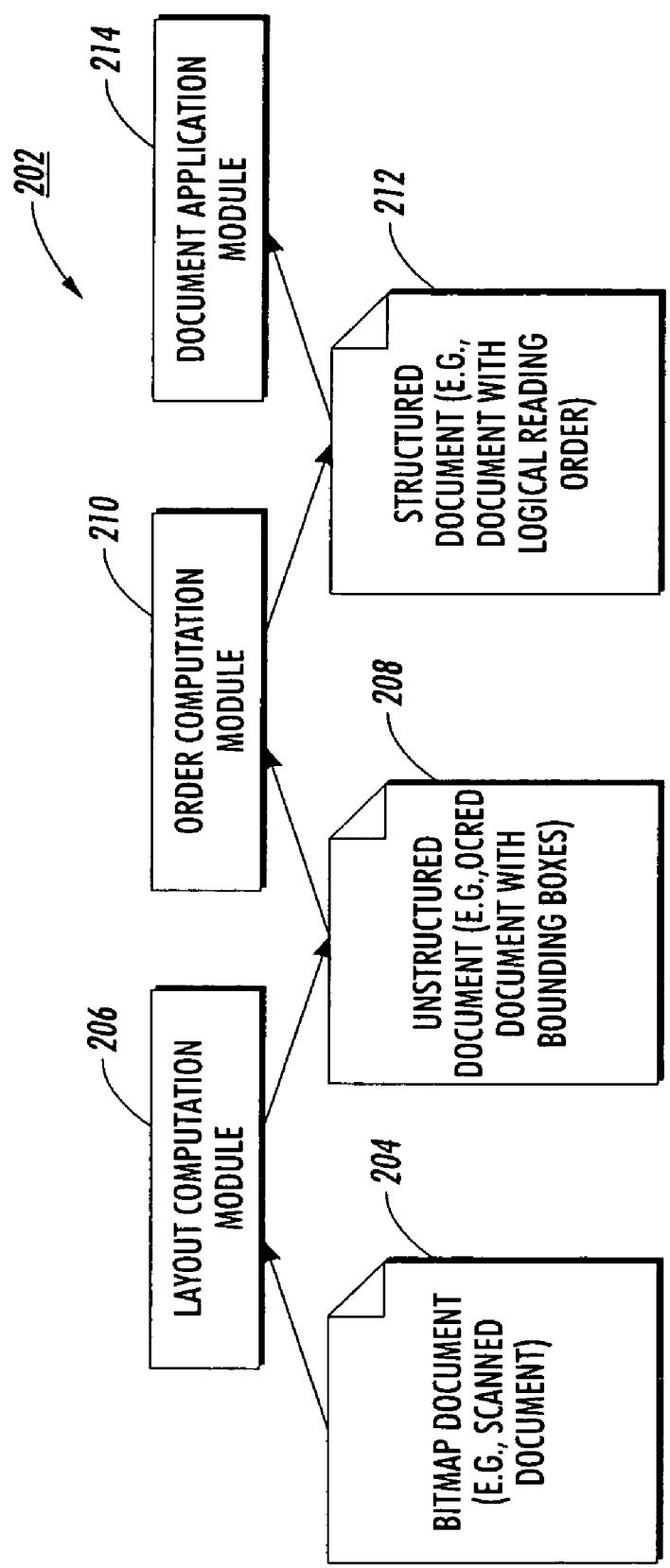
FIG. 2 illustrates a block diagram of a system for determining logical document structure.

FIG. 2 illustrates a block diagram of a system 202 for determining logical document structure. The embodiment of the system 202 shown in FIG. 2 includes three operating components: a layout computation module 206, an order computation module 210, and a document application module 214. It will be appreciated by those skilled in the art that the functions described by each module herein may be arranged so that they may be performed by any number of modules, and may include one or more of a combination of functions described and need not include all of the functionality described herein or may include additional functionality. Accordingly, there may exist any number of different arrangements in which the system 202 may be configured in accordance with the different combinations of functions and characteristics described herein.

In the embodiment of the system 202 shown in FIG. 2, the layout computation module 206 takes as input a bitmap document 204 (or partial-bitmap document), which may originate from a scanned image or from an image converted from a high-level representation to a low-level representation. The low-level representation may, for example, be an image made up of a set of image fragments (i.e., bitmaps specified by location and bounding boxes), that may have been optimized for printing, viewing, or compression (see for example U.S. Pat. No. 5,884,014, which is incorporated herein in its entirety by reference).

The layout computation module 206 processes the bitmap document 204 (or partial-bitmap document) to different degrees depending on the level of structure already present in the document (e.g., a partial-bitmap document may have layout objects in a document image segmented to a character level). The output of the layout computation module is an unstructured document 208 in which layout objects of document pages are identified. Layout objects, as defined herein, identify structural elements of a document. A layout object may include a bounding box defining an area on a document page of a layout object (e.g., its position and dimensions on the page), the type of content forming the layout object (e.g., textual data or image data), and its relationship with respect to other layout objects (e.g., horizontal and vertical distance to its nearest neighboring layout objects). In operation, the layout computation module 206 identifies layout objects and their attributes, which may include performing OCR (Optical Character Recognition) to identify textual content present in the layout objects.

Further in the system shown in FIG. 2, the unstructured document 208 is input to the order computation module 210, once produced by the layout computation module 206, or generated by an application (not shown but described in U.S. Pat. No. 5,884,014) which may produce as output a low-level or mid-level representation (i.e., application independent, e.g., postscript) of a high-level document representation (i.e., application dependent, e.g., a Microsoft Word document). In one embodiment, the unstructured document 208, which is received as input by the order computation module 210, is a document with layout objects that specify bounding boxes of one or more levels of detail (e.g., character, word, sentence, paragraph, etc.) that may include identified textual content within the bounding boxes, which in one embodiment may be identified using OCR analysis of bitmap image data. For example, an unstructured PDF document may be converted using a PDF-to-XML converter (e.g., a converter available from CambridgeDocs, Boston, Mass., USA), while removing elements such as page footers and headers in order that they not influence the ordering of layout objects on a page. Subsequently after determining the logical flow of layout objects on a document page, the page headers and footers may be added to start and end, respectively, of the determined flow of layout objects of a page. One method for identifying and removing headers and footers of a document is disclosed in U.S. patent application Ser. No. 11/032,817, entitled "Method And Apparatus For Detecting Pagination Constructs Including A Header And A Footer In Legacy Documents", which is incorporated herein by reference.

The output of the order computation module 210 is a structured document 212 which defines the logical structure (e.g., logical reading and viewing order) of the unstructured document 208. The structured document 212 may then be used by document application module 214 to perform any number of applications. For example, in one embodiment, the unstructured document 208 may be a document encoded in a portable document format such as Adobe PDF. Once converted to a structured document 212 such as XML (Extensible Markup Language), SGML (Standard Generalized Markup Language), or HTML (Hypertext Markup Language), or the like, or an application specific format, the structured document 212 may be used by, for example, a document editor or a text-to-speech application such as a text reader or a text translator that performs audible playback, or a document viewing application that scales contents depending on the screen size requiring the correct arrangement of content for display, all of which rely on the correct ordering of elements on a document page.

In one embodiment, the structured document 212 may have its content organized into delineated structural nodes, containing text, figures, and tables. The lower levels of the structure of a document may, for example, correspond to words, sentences, text blocks, or the like, while the higher levels may delineate nested, tree-like, or otherwise-organized groupings of nodes. The document structure may be implemented using markup tags interspersed through a document. In some structured document formats such as XML, a DTD (Document Type Definition) or similar dedicated document portion may be used to provide structural information about a document. The contents of the XML document may then be reused by organizations to, for example, modify or maintain legacy documents.

B. Methods for Determining Logical Document Structure

Figure 3:
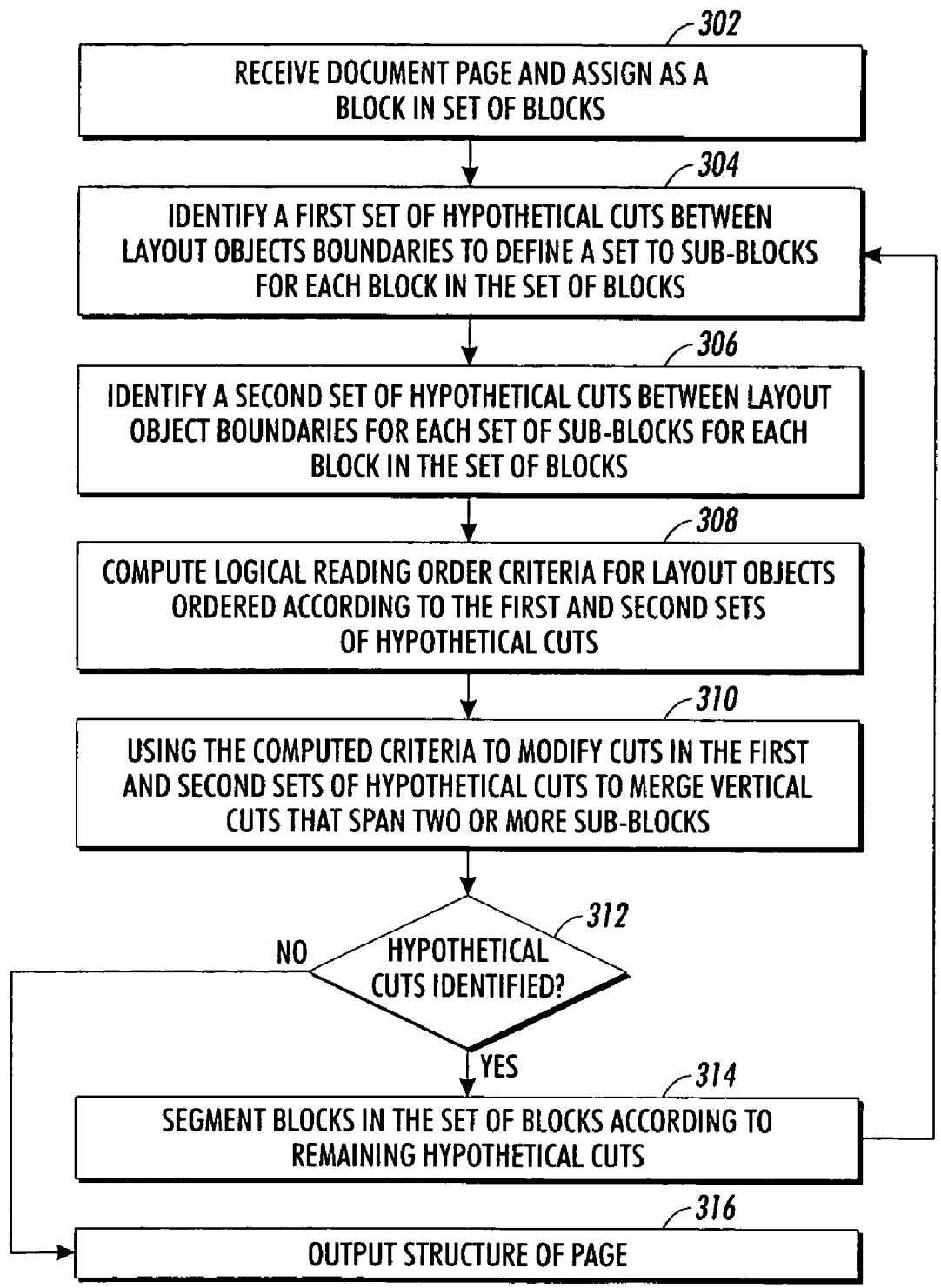
FIG. 3 sets forth a flow diagram of an embodiment for determining logical document structure.

FIG. 3 is a flow diagram for determining logical document structure, which may be performed in one embodiment by the order computation module 210 shown in FIG. 2. Upon receipt of an unstructured document 208, which as defined above has specified therein a set of layout objects that may vary with respect to their specificity (e.g., at the character, word, sentence, or paragraph level), each page of the document is processed starting at 302 in FIG. 3, in which a page of a document is assigned to be a block in a set of blocks. That is, in one embodiment, a document is assumed to comprise a set of one or more pages, which contain rectangular layout objects geometrically positioned on the page(s), with each layout object having a set of coordinates (e.g., x-y position on the page, height, width).

Figure 4:
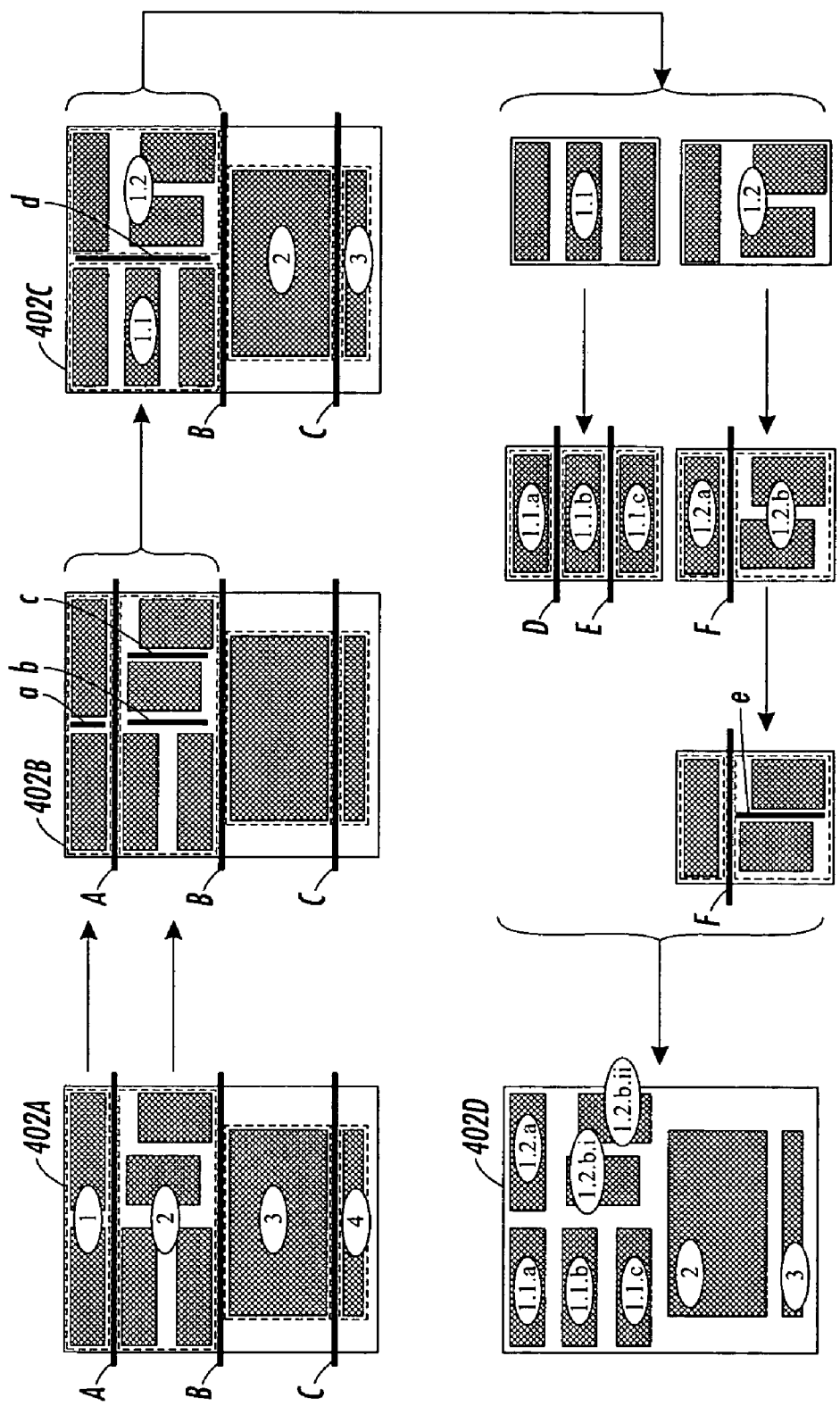
FIG. 4 illustrates an example of the method for determining logical document structure shown in FIG. 3.

At 304, a first set of hypothetical cuts (substantially) between layout object boundaries is identified (i.e., valleys) to define a set of sub-blocks for each block in the set of blocks. At 306, a second set of hypothetical cuts is identified (substantially) between layout object boundaries (i.e., valleys) for each of set of sub-blocks for each block in the set of blocks. An example of the method for determining logical document structure shown in FIG. 3 is illustrated in FIG. 4. The document page 402, shown in FIG. 4, is made up of a set of eight layout objects (shown with cross-etched fill in the document page 402). After identifying the first set of hypothetical cuts at 304, the cuts A, B, and C are identified, as illustrated at 402A. After identifying the second set of hypothetical cuts at 306, the cuts a, b, and c are identified, as illustrated at 402B. In one embodiment, the hypothetical cuts identify the widest empty rectangle between layout objects.

More specifically at 304, the first set of hypothetical cuts is selected such that cuts set forth therein span the width of each block in the set of blocks along the horizontal direction (or a first direction). For example, the cuts A, B, and C in the block 402A span the width of the block 402A. After defining the cuts A, B, and C in the block 402A, a set of sub-blocks identified as 1, 2, 3, and 4 are defined from the block 402A. At 306, cuts that span the length of each sub-block 1, 2, 3, and 4 along the vertical (or a second direction) are identified as shown at a, b, and c in the block 402B. Advantageously, by using a global approach to cutting the span of a block in both directions, the method's sensitivity to minimal horizontal cut width (i.e., line space) is relaxed. That is, setting a horizontal cut width to a value that is less than or equal to the line width in a document will not otherwise prevent layout objects of a document to be cut along correct columns. Being substantially insensitive to a minimum horizontal cut width is further advantageous in the event a document has varying line widths on a page.

At 304 and 306, thresholds are used for assessing whether potential hypothetical vertical and horizontal cuts meet a predefined minimum size (i.e., the space between layout objects). The vertical and horizontal thresholds may be the same or they may be different. In one embodiment, the vertical and/or horizontal cut thresholds are negative to permit a vertical and/or horizontal cut, respectively, to exist between layout objects that have a small (or minimally) overlapping area. In another embodiment, there may in addition be a threshold for image noise used for assessing whether proposed hypothetical vertical and/or horizontal cuts should be considered.

As set forth at 304, each block is considered globally (i.e., cuts that span the entire width or length of a block or sub-block) to select cuts among layout objects that lead to the best set of columns. In addition, the layout object cutting strategy is specified such that it favors vertical cuts over horizontal cuts in a portrait oriented document image, as illustrated in the example shown in FIG. 4. It will be appreciated, however, that alternatively the block, depending on whether it has a portrait or landscape orientation may alternatively have cuts that span a first direction that is vertical along the blocks length and cuts that span a second direction that is horizontal along the block width.

At 308, logical reading order criteria (i.e., arrangement criteria) for layout objects are computed according to the first and the second sets of hypothetical cuts. The criteria that are computed are used to compute a score function, which is maximized to cut and order the layout objects forming an image. The score function, in one embodiment, rewards the largest cumulative height of columns that may be created using the first and second sets of hypothetical cuts.

More specifically, the score function computed at 308 favors vertical cuts that span over multiple consecutive blocks. In one embodiment, the score function is based on the sum of the height of the blocks that may be merged. For example, the vertical cuts "a" and "b" (shown in block 402B) of sub-blocks 1 and 2 (shown in block 402A), respectively, may be merged to define vertical cut "d" as shown in the block 402C. In addition, sub-blocks may be merged with any number of neighboring sub-blocks, and the merging of vertical cuts need not be limited to two vertical cuts (as shown in 402B) but may instead extend to any number of vertical cuts between consecutive blocks. While there may exist different options for merging vertical cuts (e.g., vertical cuts "a" and "c" of block 402B), those cuts that are most compatible are selected.

In alternate embodiments, scoring the compatibility of merging one or more options of vertical cuts of sub-blocks may be based on a number of parameters that include one or a combination of: the cumulative height of a block created by merging vertical cuts; the vertical alignment of the merged cuts; the width of columns created if the merge is performed; and the proximity of the sub-blocks to be merged with each other. Sub-block proximity, in one embodiment, is parameterized by computing the inverse of the distance between the sub-blocks to be merged (i.e., sub-blocks that are closer to each other are favored). Column width, in one embodiment, is parameterized by defining a minimum column-width to page-width ratio (e.g., in one embodiment a minimum ratio of 1:5).

At 310, while referring again to FIG. 3, the computed arrangement criteria for scoring cuts (at 308) in the first and second sets of hypothetical cuts (identified at 304 and 306) are used to merge cuts that span two or more sub-blocks. For example, in the block 402B in FIG. 4, based on scoring results of computed arrangement criteria the vertical cuts "a" and "b" are merged to defined vertical cut "d" while eliminating vertical cut "c" and horizontal cut "A" as shown in block 402C. In order to arrive at selecting the best score, there exists the possibility that no hypothetical horizontal cuts are selected from the first set of hypothetical cuts.

At 312, if no hypothetical cuts have been identified (after being modified at 310) then the logical structure of the page is output at 316; otherwise, the current blocks in the set of blocks are segmented, at 314, according to the cuts remaining in the first and second sets of hypothetical cuts to define the set of blocks and after which 304, 306, 308, 310, and 312 are subsequently repeated. In one embodiment at 314, the segmented blocks are sized (e.g., shrunk) to fit their content (e.g., textual content), which in a further embodiment may be sized using a threshold that is robust to image noise. This aspect is illustrated in FIG. 4 by the dotted lined rectangles surrounding the layout objects shown in FIG. 4.

At 316, in one embodiment logical document reading order is induced with a heuristic that defines the reading order by cutting layout objects that are positioned at the top and at the left of a block first. When the cut layout objects are ordered as a tree of blocks, the correct reading order may be obtained by performing a depth-first left-to-right traversal of the tree. When outputting the logical structure of the page at 316, blocks are read top-to-bottom and left-to-right order, or the order in which the blocks operationally appear. For example, at 402C in FIG. 4, sub-blocks 1.1, 1.2, 2, and 3 are processed in a similar manner to block 402A, resulting in identifying hypothetical horizontal cuts "D" and "E" for block 1.1 and horizontal cut "F" for block 1.2 and vertical cut "e" for sub-block 1.2.b, which results in the identified logical structure in block 402D as blocks: 1.1.a; 1.1.b; 1.1.c; 1.2.a; 1.2.b.i; 1.2.b.ii; 2; and 3.

In an alternate embodiment, the set of ordered blocks defined at the conclusion of 316 are further processed to induce a total order among page elements (i.e., any element on a page may be related to any other element). During this additional processing step, the elements within each ordered block output at 316 are further ordered. The ordering may, in one embodiment, be carried out by cutting within a block in one direction (e.g., either horizontally or vertically) using a threshold that is less than that previously used at 304 or 306. These cuts would then form lines or columns whose content is then arranged either left-to-right or top-to-bottom depending on whether the cuts were performed horizontally or vertically, respectively. Alternatively, the ordering may be carried out by reducing the thresholds at 304 and/or 306 and repeating the operations 302, 304, 306, 308, 310, 312, 314, and 316 for each ordered block originally output at 316.

Alternatively, the flow diagram detailed in FIG. 3 may be summarized as follows. Given a block with layout objects, the method enumerates all possible horizontal cuts (e.g., cuts A, B, and C in block 402A). For each block potentially created by an enumerated horizontal cut, the method enumerates all possible vertical cuts inside it (e.g., cut "a" in sub-block 1 and cuts "b" and "c" in sub-block 2 of block 402B). Subsequently, a (possibly empty) set of horizontal cuts is (with associated vertical cuts) selected to arrive at the best possible merger of vertical cuts, given the resulting scores for the different alternatives. The selected set of horizontal cuts is performed, and then for each block that is created by the cuts, the associated vertical cuts are performed. This process repeats for each block that is created by selected horizontal cuts and associated vertical cuts until no additional cuts may be made.

C. Recursive Method with Dynamic Programming

FIG. 5 sets forth an alternate embodiment for determining logical document structure that uses recursion and dynamic programming to enumerate through all possible combinations of horizontal and vertical cuts of a document image. Dynamic programming (which is described, for example, in the Wikipedia encyclopedia available on the Internet at en.wikipedia.org) may be used to reduce computational complexity when enumerating through all possible combinations of horizontal and vertical cuts of a document image. Briefly, dynamic programming involves optimizing a main problem by decomposing it into sub-problems that appear several times when resolving the main problem. Computations performed by each sub-problem are recorded (i.e., memorized) for reuse when solving other sub-problems encountering the same computations.

More specifically, FIG. 5 sets forth pseudo code of a function BC that recursively solves a sub-problem using dynamic programming. For simplicity, only scores are shown as being returned by the function BC and not other solution details, such as vertical cuts. The function BC solves the sub-problem of scoring each sub-block if it is chosen given a set of pre-computed horizontal cuts. That is, the sub-problem consists in examining different possible sub-blocks created by horizontal cuts and determining whether to merge potential vertical cut(s) in neighboring sub-blocks, or impede the merging of vertical cuts between neighboring blocks by horizontally cutting the examined sub-block using the pre-computed horizontal cuts. For example, given the four sub-blocks 1, 2, 3, and 4 after pre-computing horizontal cuts A, B, and C in block 402A, the four sub-blocks are each assessed by the function BC set forth in FIG. 5 to solve the sub-problem of whether to retain pre-computed horizontal cuts or merge possible vertical cuts in the sub-blocks.

Figure 6:
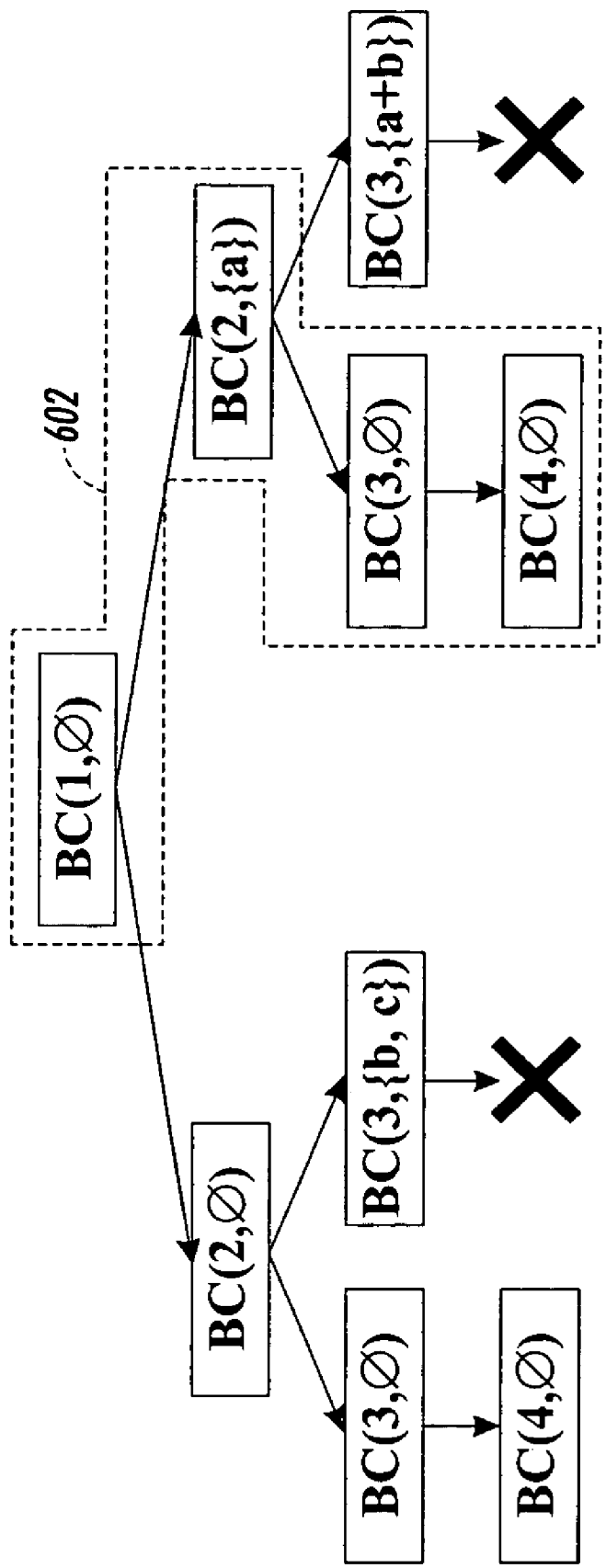
FIG. 6 illustrates an example computation of the alternate embodiment in FIG. 5 using the example page shown in FIG. 4.

Referring now to the details of the function BC set forth in FIG. 5, BC(i, X) may be computed by computing the maximum among BC(i+1, X') and BC(i+1, Ø). Initially, "i" refers to a list of possible sub-blocks of a horizontally cut block. "X'" denotes the intersection of the set of vertical cuts X with the set of possible vertical cuts in block "i". "Ø" denotes that no vertical cuts have been imposed in block i+1 (i.e., that a horizontal cut separates block i and block i+1). "#" denotes that a comment follows. FIG. 6 illustrates the sub-problem computation performed by BC detailed in FIG. 5 for the example block 402A shown in FIG. 4. The leaf nodes represent the different possible final segmentations of the page, which are each scored. Leaf nodes that lead to invalid combinations are identified in FIG. 6 with an "X". The recursive computation returning the highest score is identified by the set of nodes identified by reference number 602, in which sub-blocks 1 and 2 are combined before applying vertical cut "d" to define sub-blocks 1.1 and 1.2, as shown in FIG. 4. FIG. 6 also shows how the computation benefits from dynamic programming as no duplicate computation is performed for BC(i,X) (i.e., once BC(i,X) has been computed once, e.g., BC(4, Ø), it is not computed a second time).

D. Miscellaneous

To recapitulate, the methods described herein for recovering or determining logical structure of a document find (biggest) empty valleys (e.g., rectangles) entirely crossing a block or sub-block being examined, either vertically or horizontally. The block is then segmented into sub-blocks, which are sized to fit their content. The method is, in one embodiment, applied recursively to each segmented sub-block, which stops when no valley large enough may be found in any of the segmented blocks. The method makes use of three parameters: first and second thresholds that define minimum vertical and horizontal valley size and a third threshold that defines minimum vertical width of a block before it may be split. The segmentation selected is based on a scoring function that, for one reading order, discards horizontal cuts in favor of vertical cuts shared among neighboring sub-blocks. The order in which the blocks and sub-blocks are segmented is then used to define the logical structure of the document, such as its reading order.

It will be appreciated that layout objects of a document may take on a number of forms besides purely rectangular forms. In the event a document processed in accordance with the methods described herein contains, for example, an "L" shaped layout object that does not permit it to be cut (or segmented) completely in either direction (i.e., horizontally or vertically), the "L" shape may be temporarily ignored while processing the remaining layout objects in the document. Layout objects that contain lists may be segmented in two layout objects such that the vertical cut segmenting the layout object containing the list identifier (e.g., bullet) and the layout object containing the text block is discarded. The layout object containing the list identifier may then be marked as pertaining to the "prefixed text" class of the layout object containing the text block.

It will be further appreciated that the methods described herein are described for documents that follow a left-to-right and top-to-bottom page reading or viewing order. It will be appreciated by those skilled in the art that the methods described herein may be readily modified to operate with alternate reading or viewing orders of documents, for example, in languages that follow a right-to-left reading order by giving priority to layout objects from right-to-left as opposed from left-to-right as shown in the example in FIG. 4. In the event geometric features of a document image leave open multiple possible valid orderings, other features, such as a layout object's textual content, may be exploited to resolve such ambiguous cases.

Those skilled in the art will recognize that a general purpose computer may be used for implementing the system 202 shown in FIG. 2 and described herein. Such a general purpose computer would include hardware and software. The hardware would comprise, for example, a processor (i.e., CPU), memory (ROM, RAM, etc.), persistent storage (e.g., CD-ROM, hard drive, floppy drive, tape drive, etc.), user I/O, and network I/O. The user I/O can include a camera, a microphone, speakers, a keyboard, a pointing device (e.g., pointing stick, mouse, etc.), and the display. The network I/O may for example be coupled to a network such as the Internet. The software of the general purpose computer would include an operating system and application software providing the functions of the system 202.

Further, those skilled in the art will recognize that the forgoing embodiments may be implemented as a machine (or system), process (or method), or article of manufacture by using standard programming and/or engineering techniques to produce programming software, firmware, hardware, or any combination thereof. It will be appreciated by those skilled in the art that the flow diagrams described in the specification are meant to provide an understanding of different possible embodiments. As such, alternative ordering of the steps, performing one or more steps in parallel, and/or performing additional or fewer steps may be done in alternative embodiments.

Any resulting program(s), having computer-readable program code, may be embodied within one or more computer-usable media such as memory devices or transmitting devices, thereby making a computer program product or article of manufacture according to the embodiment described herein. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the embodiments as set forth in the claims.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the embodiments may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the disclosure as set forth in the claims.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for determining a logical order of a document, comprising:
   (a) assigning a page of the document to be a block having a width along a first direction and a length along a second direction perpendicular to the first direction; the block having a plurality of layout objects arranged therein;
   (b) identifying a first set of hypothetical cuts, substantially between layout object boundaries, that span the width of the block; the first set of hypothetical cuts defining a set of sub-blocks with each sub-block having a width along the first direction and a length along the second direction;
   (c) identifying a second set of hypothetical cuts, substantially between layout object boundaries, that span the length of sub-blocks in the set of sub-blocks;

(d) computing arrangement criteria of layout objects ordered according to the first and the second sets of hypothetical cuts;
(e) modifying cuts in the first and second sets of hypothetical cuts, using the computed arrangement criteria, to merge cuts that span two or more sub-blocks along the second direction by removing one cut in the first set of hypothetical cuts and combining two cuts in the second set of hypothetical cuts; and
(f) determining the logical order of the document using cuts between layout objects in the block remaining in the first and second sets of hypothetical cuts after performing (e).

2. The method according to claim 1, further comprising:
(g) segmenting the layout objects in the block using the cuts remaining in the first and second set of hypothetical cuts after performing (e) to define a set of blocks;
(h) repeating (b)-(e) for each block in the set of blocks defined at (g).

3. The method according to claim 2, wherein said identifying at (b) and (c) use thresholds for assessing whether potential cuts meet a first predefined minimum size.

4. The method according to claim 3, further comprising:
(i) reducing one of more of the thresholds used at (b) and (c) for assessing whether potential cuts meet a second predefined minimum size; and
(j) repeating (a)-(h).

5. The method according to claim 1, wherein each of the plurality of layout objects has one of a plurality of types of content.

6. The method according to claim 5, wherein the plurality of types includes textual content and image content.

7. The method according to claim 1, further comprising modifying cuts in the first or second sets of hypothetical cuts by: (i) grouping cuts in the second set of hypothetical cuts that span two or more sub-blocks in the set of sub-blocks along the first direction, and (ii) eliminating cuts in the first set of hypothetical cuts that divide a span between two or more sub-blocks along the second direction.

8. The method according to claim 7, further comprising modifying cuts in the second set of hypothetical cuts by (iii) eliminating cuts in the second set of cuts that indicate logical groupings of layout objects along the first direction.

9. The method according to claim 1, wherein computing arrangement criteria of layout objects ordered according to the first and the second sets of hypothetical cuts further comprises computing inverse of distance between layout objects that form blocks from cuts along the second direction that may be merged.

10. The method according to claim 1, further comprising processing the document to tag the layout objects as being one of a plurality of types of content.

11. The method according to claim 10, wherein said processing tags the layout objects as being textual content or image content, or both.

12. The method according to claim 1, wherein the logical order is used for arranging textual content for audible playback.

13. The method according to claim 1, wherein the logical order is used for arranging scaled content for a display.

14. The method according to claim 1, wherein dynamic programming is used to compute the arrangement criteria of layout objects ordered according to the first and the second sets of hypothetical cuts.

15. The method according to claim 1, wherein computing arrangement criteria of layout objects ordered according to the first and the second sets of hypothetical cuts further comprises assessing one or a combination of: cumulative height of a block created by merging vertical cuts; vertical alignment of merged cuts; width of columns created by cuts; and proximity of sub-blocks to be merged with each other.

16. An apparatus for determining a logical order of a document, comprising:
a memory for storing processing instructions of the apparatus; and
a processor coupled to the memory for executing the processing instructions of the apparatus; the processor in executing the processing instructions:
(a) assigning a page of the document to be a block having a width along a first direction and a length along a second direction perpendicular to the first direction; the block having a plurality of layout objects arranged therein;
(b) identifying a first set of hypothetical cuts, substantially between layout object boundaries, that only span the entire width of the block, wherein any hypothetical cut in the first direction that is less than the entire width of the block is excluded; the first set of hypothetical cuts defining a set of sub-blocks with each sub-block having a width along the first direction and a length along the second direction;
(c) identifying a second set of hypothetical cuts, substantially between layout object boundaries, that span the length of sub-blocks in the set of sub-blocks;
(d) computing arrangement criteria of layout objects ordered according to the first and the second sets of hypothetical cuts;
(e) modifying cuts in the first and second sets of hypothetical cuts, using the computed arrangement criteria, to merge cuts that span two or more sub-blocks along the second direction;
(f) determining the logical order of the document using cuts between layout objects in the block remaining in the first and second sets of hypothetical cuts after performing (e).

17. The apparatus according to claim 16, wherein the processor in executing said processing instructions further comprises:
(g) segmenting the layout objects in the block using the cuts remaining in the first and second set of hypothetical cuts after performing (e) to define a set of blocks;
(h) repeating (b)-(e) for each block in the set of blocks defined at (g).

18. The apparatus according to claim 17, wherein said identifying at (b) and (c) use thresholds for assessing whether potential cuts meet a first predefined minimum size.

19. The apparatus according to claim 18, further comprising:
(i) reducing one or more of the thresholds used at (b) and (c) for assessing whether potential cuts meet a second predefined minimum size; and
(j) repeating (a)-(h).

20. The apparatus according to claim 16, wherein the processor in executing said processing instructions further comprises modifying cuts in the first or second sets of hypothetical cuts by: (i) grouping cuts in the second set of hypothetical cuts that span two or more sub-blocks in the set of sub-blocks along the first direction, and (ii) eliminating cuts in the first set of hypothetical cuts that divide a span between two or more sub-blocks along the second direction.

21. The apparatus according to claim 20, wherein the processor in executing said processing instructions further comprises modifying cuts in the second set of hypothetical cuts by (iii) eliminating cuts in the second set of cuts that indicate logical groupings of layout objects along the first direction.

22. The apparatus according to claim 16, wherein the processor in executing said processing instructions to compute arrangement criteria of layout objects ordered according to the first and the second sets of hypothetical cuts further comprises assessing one or a combination of: cumulative height of a block created by merging vertical cuts; vertical alignment of merged cuts; width of columns created by cuts; and proximity of sub-blocks to be merged with each other.

23. An article of manufacture for determining a logical order of a document, the article of manufacture comprising computer usable media including computer readable instructions embedded therein that causes a computer to perform a method wherein the method comprises:
 (a) assigning a page of the document to be a block having a width along a first direction and a length along a second direction perpendicular to the first direction; the block having a plurality of layout objects arranged therein;
 (b) identifying a first set of hypothetical cuts, substantially between layout object boundaries, that span the width of the block; the first set of hypothetical cuts defining a set of sub-blocks with each sub-block having a width along the first direction and a length along the second direction;
 (c) identifying a second set of hypothetical cuts, substantially between layout object boundaries, that span the length of sub-blocks in the set of sub-blocks;
 (d) computing arrangement criteria of layout objects ordered according to the first and the second sets of hypothetical cuts;
 (e) modifying cuts in the first and second sets of hypothetical cuts, using the computed arrangement criteria, to merge cuts that span two or more sub-blocks along the second direction by removing one cut in the first set of hypothetical cuts and combining two cuts in the second set of hypothetical cuts; and
 (f) determining the logical order of the document using cuts between layout objects in the block remaining in the first and second sets of hypothetical cuts after performing (e).

* * * * *